No. 697,647. Patented Apr. 15, 1902.
E. MUMMENDEY.
PIPETTE.
(Application filed Mar. 17, 1902.)
(No Model.)
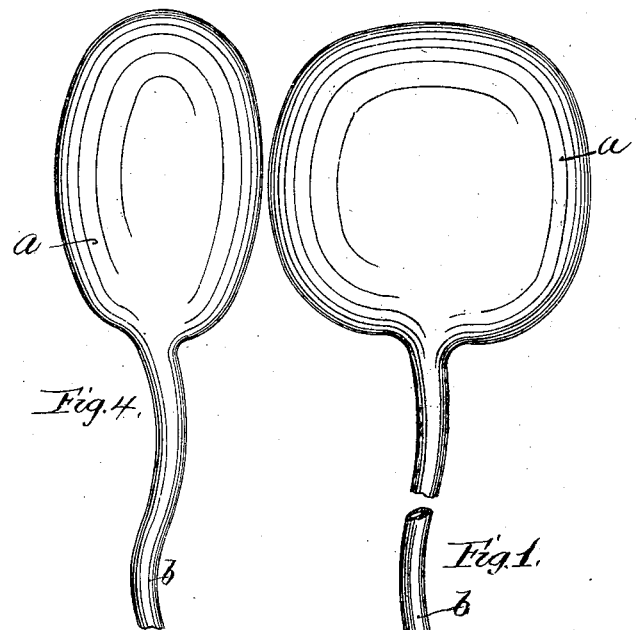
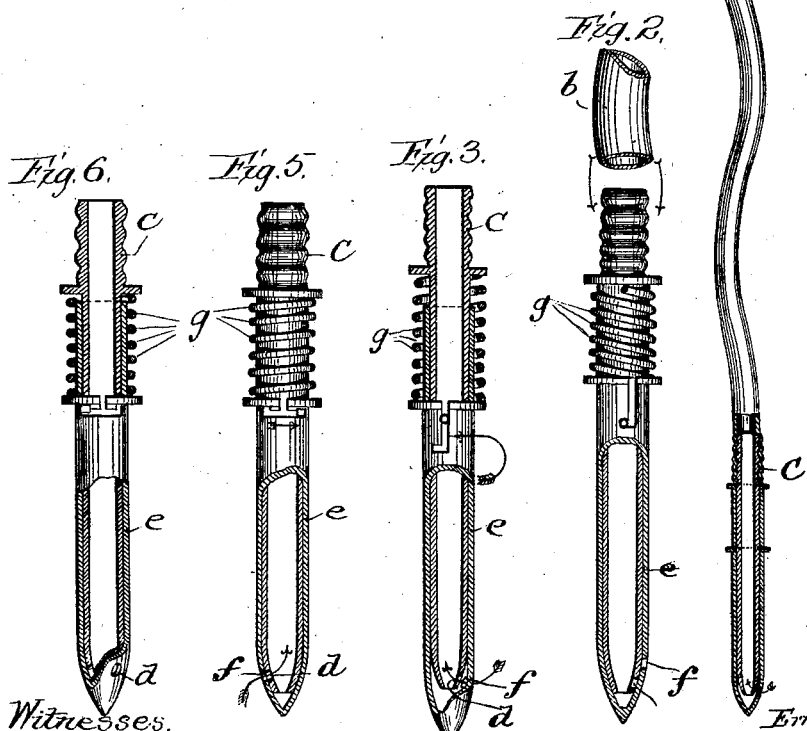
Witnesses.
Inventor:
Ernst Mummendey
By Knight Bros
Attys

UNITED STATES PATENT OFFICE.

ERNST MUMMENDEY, OF BERGHEIM-ON-THE-ERFT, GERMANY.

PIPETTE.

SPECIFICATION forming part of Letters Patent No. 697,647, dated April 15, 1902.

Application filed March 17, 1902. Serial No. 98,708. (No model.)

*To all whom it may concern:*

Be it known that I, ERNST MUMMENDEY, merchant, a subject of the King of Prussia and Emperor of Germany, residing at Bergheim-on-the-Erft, in the Kingdom of Prussia and Empire of Germany, have invented certain new and useful Improvements in Appliances for Unobservedly Removing Liquors from Glasses and the Like, of which the following is a specification.

This invention has reference to a pipette or appliance intended to be used by persons who in the pursuit of their calling are requested or expected to drink intoxicating liquors; and my invention has for its object and effect to provide an apparatus by which the liquor may be rapidly removed from the glass or other receptacle without attracting attention of others.

My invention is illustrated in the annexed drawings, in which—

Figure 1 shows a section of the whole device. Fig. 2 shows in section the closing appliance to an enlarged scale when shut, and Fig. 3 shows the same when open. Fig. 4 shows the container part of the device. Fig. 5 shows a modified construction of closing appliance when in the open position, and Fig. 6 same when shut.

As will be seen from the drawings, the appliance consists of a large container $a$, which may be suitably made of india-rubber or other elastic or flexible material. This container when the apparatus is in use is carried concealed in an inner breast-pocket of the wearer's coat. Connected with the container is a rubber tube $b$ of suitable length, which at its upper end is provided with a nozzle $c$, and this nozzle, which has an aperture $d$, first covered with a sheet-metal casing $e$, provided with an aperture $f$. In this construction (illustrated in Figs. 2 and 3) the sheet-metal casing $e$ is normally held by means of a spring $g$ in such a manner that the two apertures $d$ and $f$ do not coincide and the appliance is therefore closed. When in use, the casing $e$ and the nozzle $c$ are so displaced in relation to each other that the apertures $d$ and $f$ coincide, (see Fig. 3,) so that there is a passage from the outside to the container $a$. As shown in Figs. 2 and 3, the casing is displaced longitudinally in relation to the nozzle $e$.

In the modification illustrated in Figs. 5 and 6 coincidence of the apertures $d$ and $f$ is obtained by the casing $e$ being displaced laterally, and in this case also the spring $g$ keeps the casing $e$ in the shut position when the appliance is not in use. In all cases the apertures $d$ and $f$ are preferably as near as possible to the point of the device. For practical reasons the upper portion may be given the form of a lead-pencil or the like.

In using the appliance a vacuum is produced in the container $a$ by pressure on the same, the apertures $d$ and $f$ being open to each other and the external atmosphere. The aperture $d$ is then closed by the casing $e$ being moved about the nozzle $c$. If now the nozzle $c$ is put into the liquor and opened in same, the liquor is forced or pipetted, by reason of the external pressure, into the container $a$. The nozzle is then released, and $c$ and $a$ revert to the "closed" position, and thus prevent discharge of the liquid.

What I claim, and desire to secure by Letters Patent, is—

1. A pipette, comprising a flexible container, having a tube terminating in a rigid nozzle with an aperture through same; a casing also provided with an aperture fitting over said nozzle; and a spring, whereby said apertures in nozzle and casing respectively, are held out of coincidence when the appliance is not being used; substantially as described.

2. A pipette, comprising a flexible container $a$, tube $b$ and nozzle $c$, having an aperture $d$; a casing $e$ provided with aperture $f$, and a spring $f$ $g$, whereby said apertures $d$ and $f$ are held out of coincidence when the appliance is not in use, substantially as described.

In witness whereof I subscribe my signature in presence of two witnesses.

ERNST MUMMENDEY.

Witnesses:
 CARL SCHMITT,
 JOH. SCHOLZ.